United States Patent Office 3,334,211
Patented Aug. 1, 1967

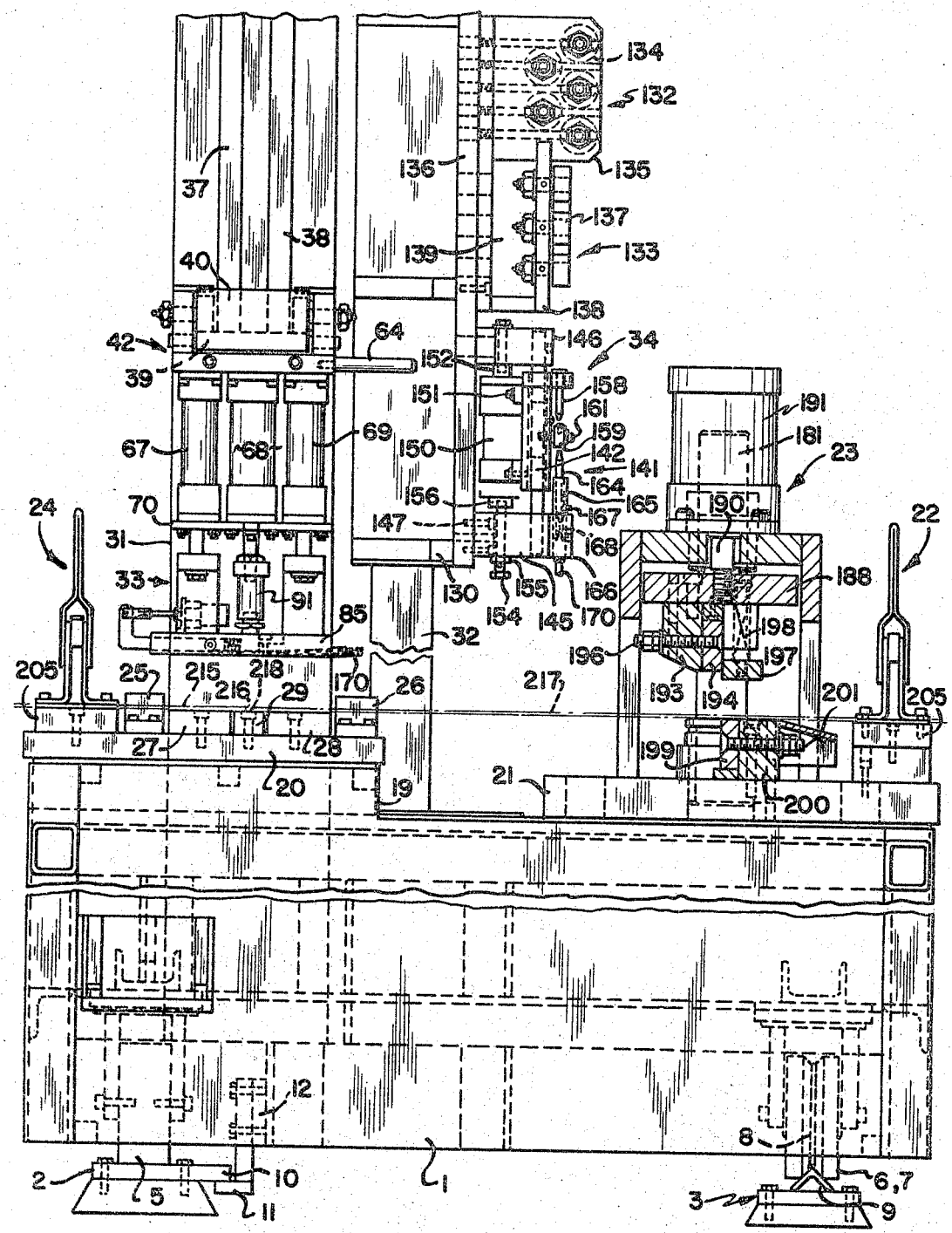

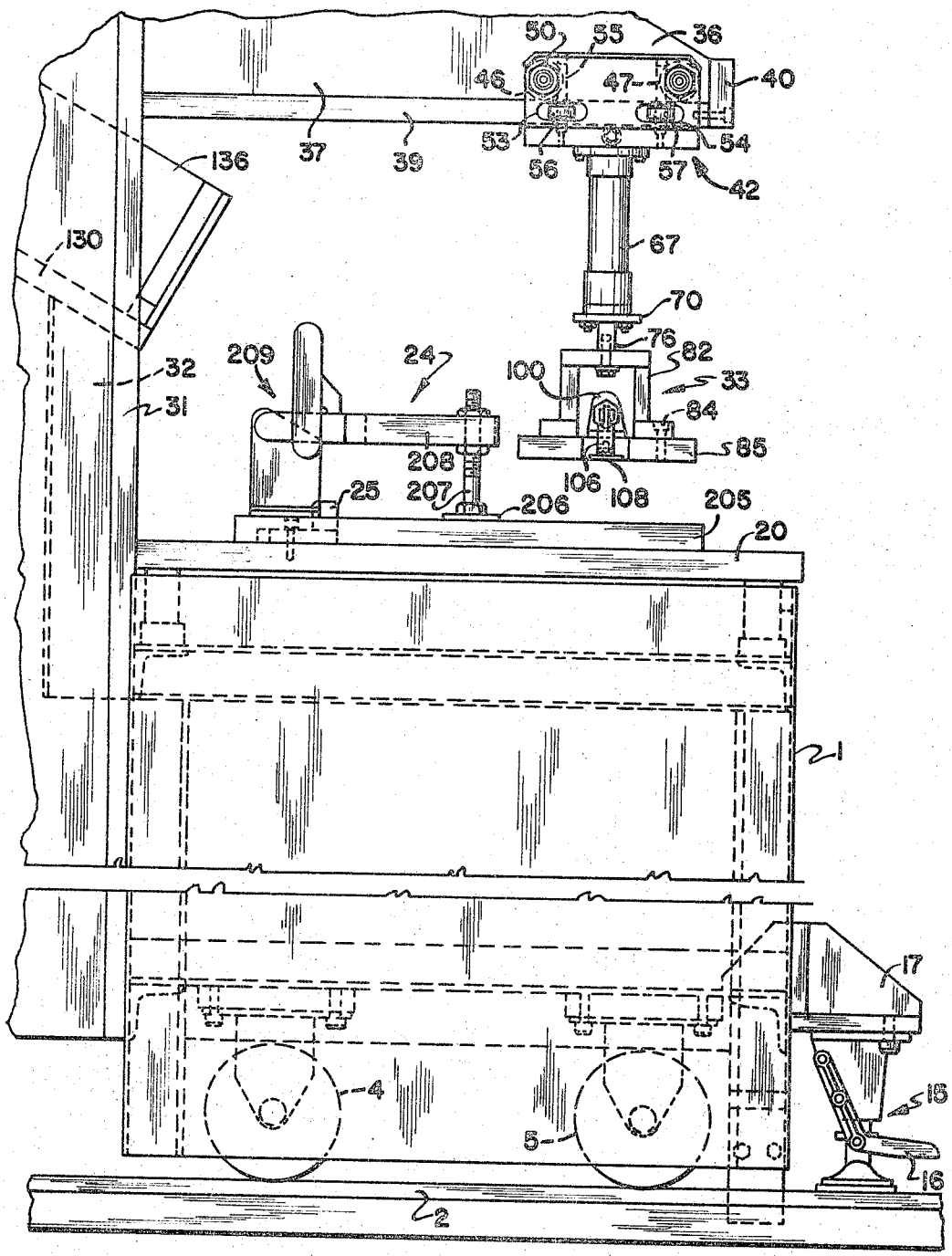

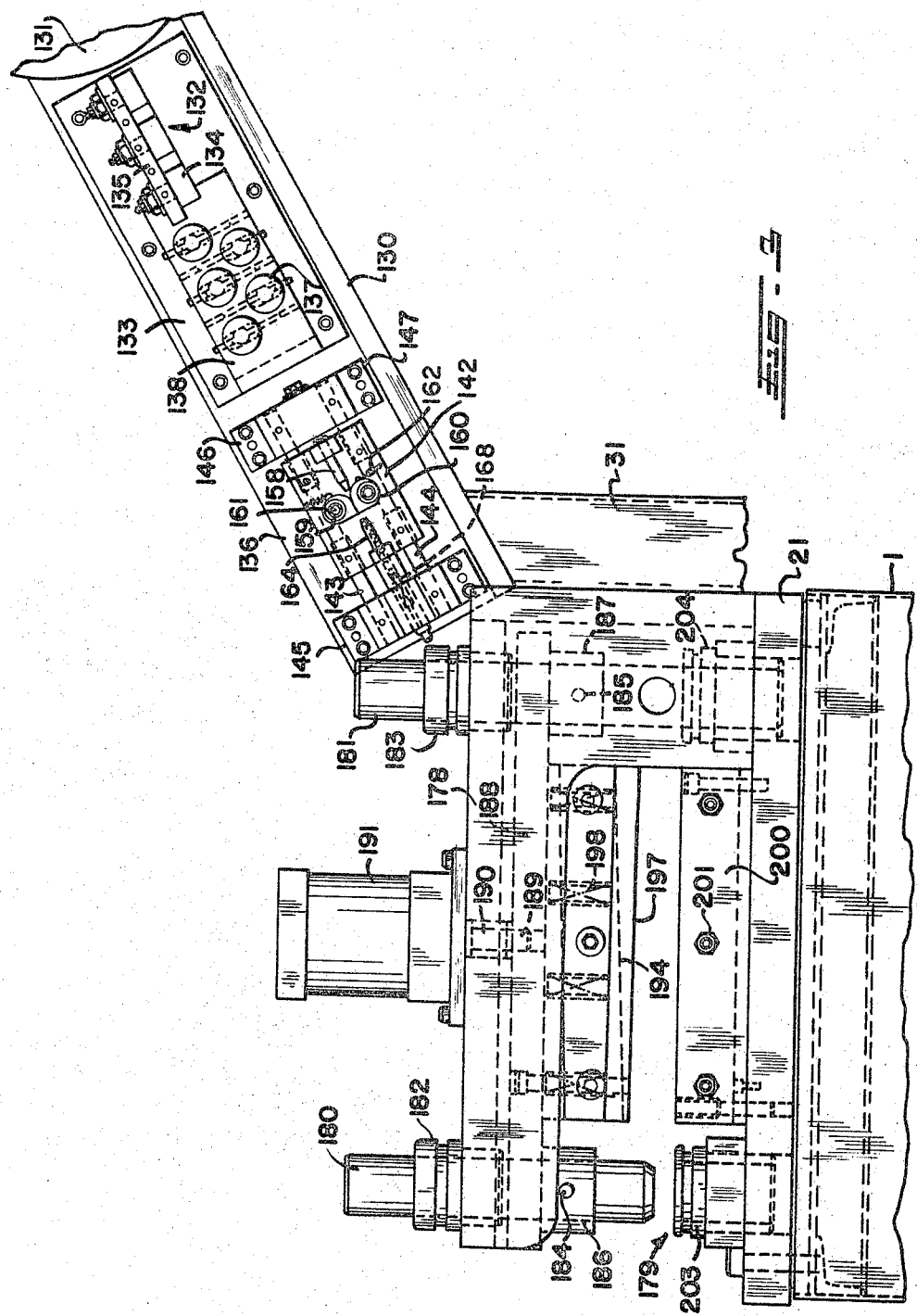

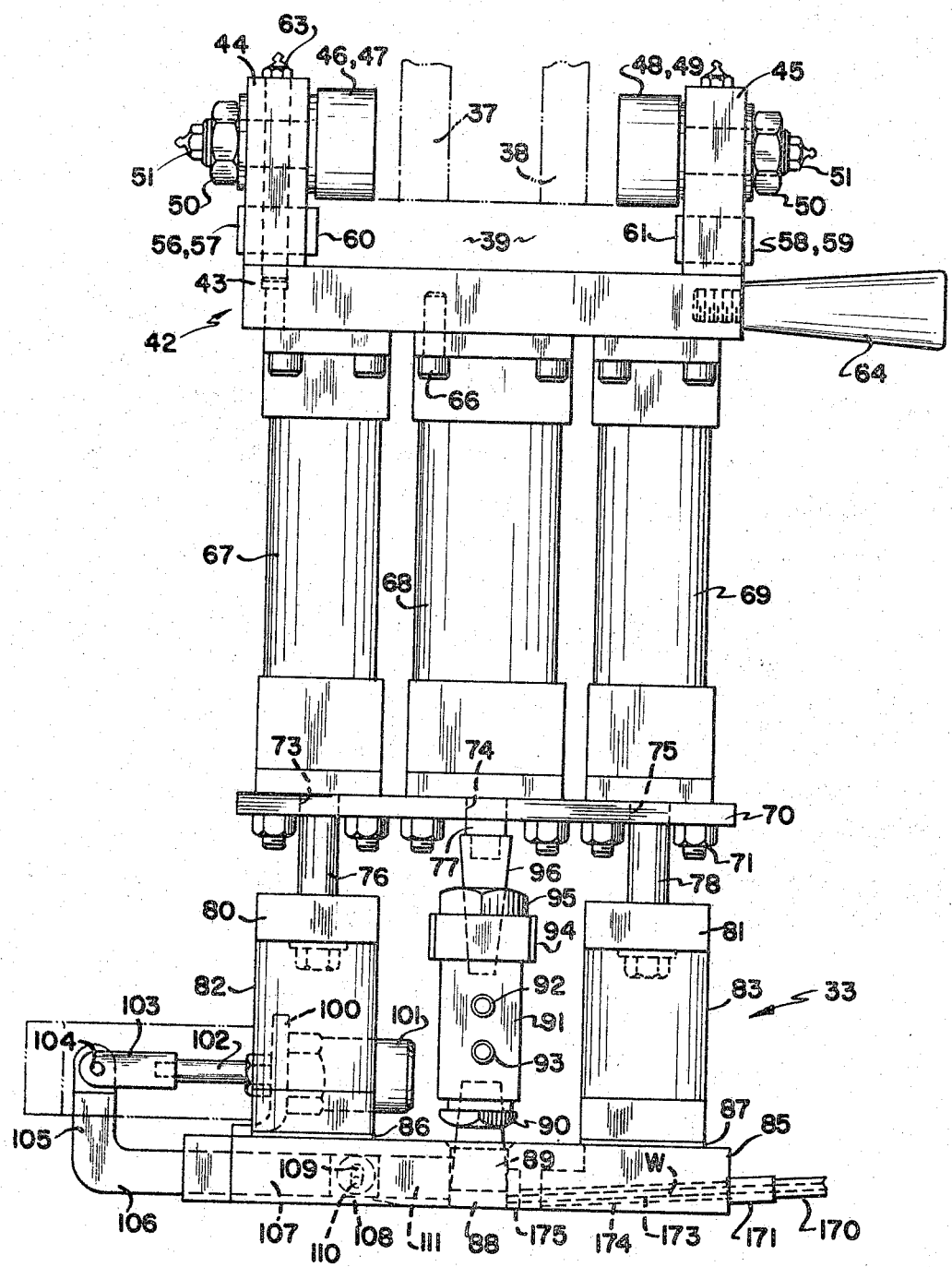

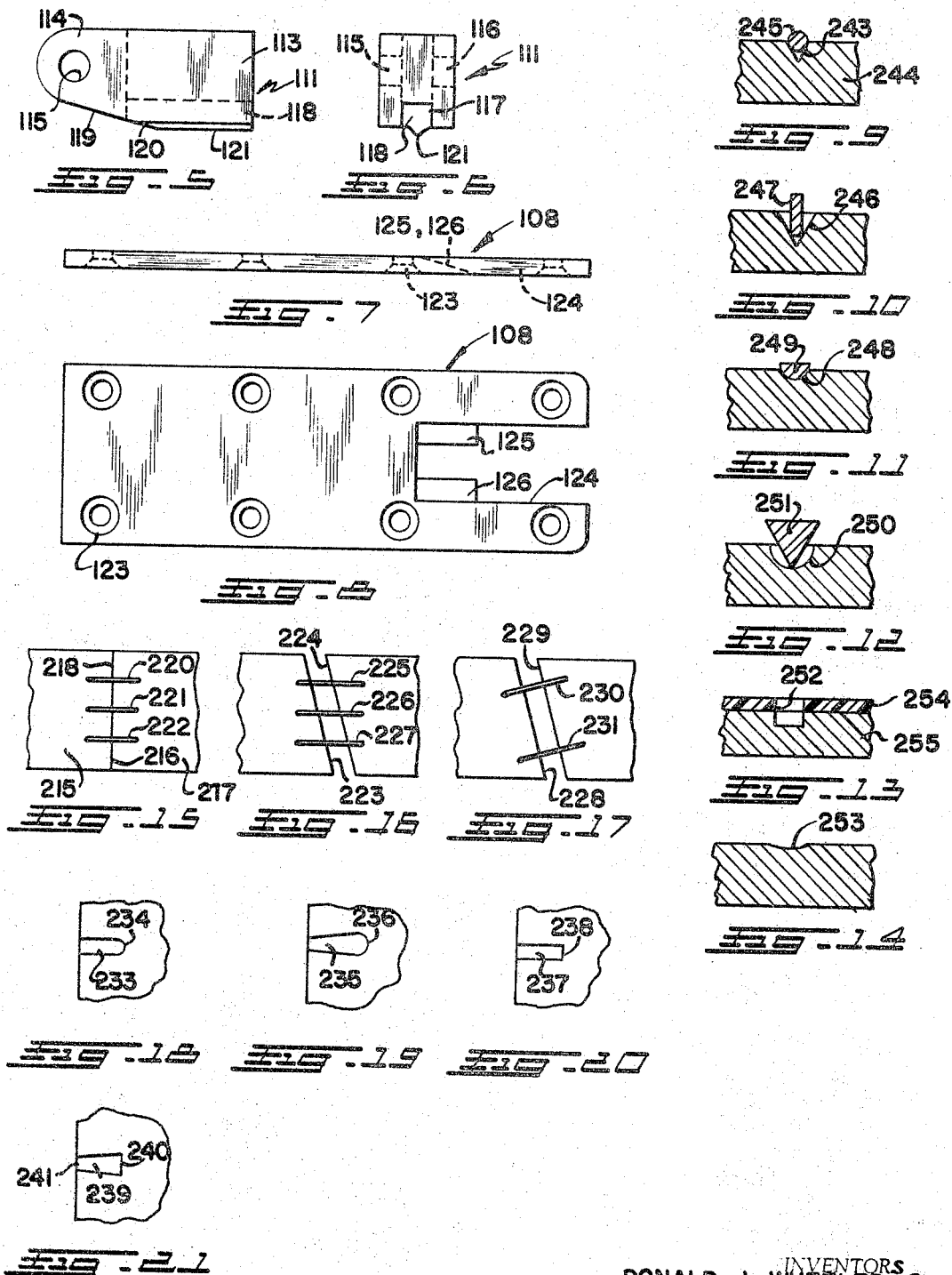

3,334,211
METHOD AND APPARATUS FOR JOINING
STRIP MATERIAL
Donald J. Wheeler, Kent, and Victor Lohrenz, Bedford, Ohio, assignors to Guild Metal Joining Equipment Company, Bedford, Ohio, a corporation of Ohio
Filed Oct. 23, 1963, Ser. No. 318,354
23 Claims. (Cl. 219—78)

This invention relates as indicated to a method and apparatus for joining strip material and more particularly to a process and machine finding a high degree of utility in continuous strip processing wherein metal, plastic, coated metal strip and the like is joined for continuous processing operations.

In lines for processing metal or plastic strips, webs, and the like, irregularities in the work can cause severe damage to subsequent processing equipment. For such a mill or line to operate continuously, the leading end of a metal, plastic, or laminate strip must be joined to the trailing end of a previous strip in a quick and accurate manner with a joint of sufficient tensile strength which will not in any way damage the equipment or tools in the line such as reducing or forming rolls, brushes, cut-offs blanking, stamping or other processing equipment. While a lap weld joint may produce a high strength junction between strip ends, the overlap condition, of course, produces an irregularity which sometimes cannot be tolerated. Moreover, since that portion of the strip which forms the joint is generally cut-out as scrap after the completion of the operation, it is apparent that the least expensive and most economical joint having the requisite strength and lack of surface irregularities is most desirable. Finally, it is most difficult to join quickly and expeditiously to produce a high strength joint plastic coated metal or galvanized metal in that a weld joint cannot readily be produced therein and either complex expensive weld joints have been required or a lap joint producing the aforementioned undesirable surface irregularities.

Accordingly, it is a principal object of the present invention to provide a process and machine for producing quickly and economically a high strength strip joint.

Another principal object is the provision of a process and machine by which strip materials can be joined without surface irregularities or substantial increases in thickness of the work.

Another object is the provision of a machine for joining strip materials which may be operated manually or automatically quickly to join strip ends in a highly economical manner.

Yet another object is the provision of a method for joining strip materials utilizing a minimum of joint material.

Another yet further object is the provision of a method and apparatus which will quickly and efficiently connect strip ends with a high strength joint while not increasing the thickness of the material.

A yet further object is the provision of a stitch welder which will quickly and efficiently join coated strip materials by first forming and then welding such materials in the formed portions thereof.

Finally, it is an object of the present invention to provide a unique strip joint whcih may readily be produced by the process and apparatus of the present invention.

Other objects and advantages of the present invention will become apparent as the following description proceeds.

To the accomplishment of the foregoing and related ends, the invention, then, comprises the features hereinafter fully described and particularly pointed out in the claims, the folowing description and the annexed drawings setting forth in detail certain illustrative embodiments of the invention, these being indicative, however, of but a few of the various ways in which the principle of the invention may be employed.

In said annexed drawings:

FIG. 1 is a fragmentary front elevation partially broken away and in section of a machine for joining strip material in accordance with the present invention with the stitch wire feed mechanism broken away and rotated through a vertical plane to the plane of FIG. 1 for clarity of illustration;

FIG. 2 is a fragmentary end elevation of the machine of FIG. 1 as seen from the left or exit end thereof with the shear mechanism removed for clarity of illustration;

FIG. 3 is a fragmentary end elevation of the machine as seen from the right or entry end in FIG. 1 with the entry end strip clamp and the welding mechanism removed for clarity of illustration;

FIG. 4 is an enlarged front elevation of the welding head unit;

FIG. 5 is an enlarged side elevation of the strip indenting tool;

FIG. 6 is an end elevation of such tool as seen from the right in FIG. 5;

FIG. 7 is a side elevation of the retaining plate secured to the bottom of the pressure pad of the welding head unit;

FIG. 8 is a top plan view of such retaining plate;

FIGS. 9 through 12 are enlarged fragmentary sectional views which illustrate various shapes of stitch wires and grooves which may be employed to form the joint of the present invention;

FIG. 13 is a similar vertical section illustrating a further form of groove penetrating a coating on such strip;

FIG. 14 is a similar section illustrating a still further quite shallow form of groove;

FIGS. 15 through 17 are fragmentary top plan views schematically illustrating various types of joints that may be produced by the process and machine of the present invention; and FIGS. 18 through 21 illustrate respectively various embodiments in top plan of the indentation that may be formed in the ends of strip material to receive the stitch wire therein.

Referring now to the annexed drawings in detail and more particularly to FIGS. 1 through 3, it will be seen that the illustrated machine is mounted on a base or frame 1 supported on rails 2 and 3 by rollers 4, 5, 6 and 7. Whereas the rail 2 may comprise simply a horizontal plate and the rollers 4 and 5 may have right circular cylindrical surfaces riding thereon, the rollers 6 and 7 are each provided with central grooves 8 which receive inverted angle 9 mounted on the rail 3. In this manner the stand and machine supported thereon is held against lateral movement with respect to the rails 2 and 3. The rail 2 may also include a projecting lateral edge 10 which overlies L-shape bracket 11 secured to the base 1 and indicated at 12 firmly to hold the stand to the base. The base 1 is, of course, mounted on rails for movement to and from a line position and in such line position may be held locked in place by latch assembly 15 operated by handle 16 which is secured beneath bracket 17 mounted on the front of the base. By manipulation of the handle 16, the stand may be released and the machine pushed to the rear or an out-of-line position (see FIG. 2).

With special reference to FIG. 1, it will be seen that the top of the frame 1 is offset as indicated at 19, such vertically offset portion having mounted thereon an anvil or bed frame plate 20. The lower surface of the top of the base is provided with a base plate 21 supporting an entry clamp 22 and a shear unit shown generally at 23.

The anvil plate 20 supports an exit clamp 24, exit side guide 25, entry side guide 26 with strip support backups 27 and 28 therebetween and a lower electrode 29 between such backups.

Posts 31 and 32 extending from the back of the base 1 support a stitch head assembly shown generally at 33 and a wire guide and feed unit shown generally at 34, respectively. As seen in FIG. 2, the post 31 includes a horizontally extending frame 36 which may be composed of vertical plates 37 and 38 (see FIG. 4) having a horizontal plate or rail 39 secured to the bottom thereof. A stop plate 40 is secured to the end of the rail or bottom plate 39 and a stitch head index carriage 42 is mounted on the rail for movement therealong.

With reference now to FIGS. 2 and 4, it will be seen that the index carriage 42 comprises a support plate 43 having upstanding plates 44 and 45 secured to the top thereof at the edges. Rollers 46, 47, 48 and 49 project inwardly from the vertical plates 44 and 45 and ride on top of the laterally projecting portions of the rail 39. Such rollers may be secured by nuts 50, and grease fittings 51 are also provided. The carriage 42 is thus pendently supported from the rail 39. Each upstanding plate 44 and 45 is provided with spaced slots 53 and 54 in which are journalled on vertically extending pins 55 rollers 56, 57, 58 and 59. These rollers bear against the lateral edges 60 and 61 of the rail 39 and maintain the carriage 42 against lateral play with respect to the rail. Grease fittings 63 may be provided in the pins 55 for lubrication of the rollers 56 through 59. A handle 64 may be secured to the edge of the plate 43 so that the carriage 42 may be indexed manually along the rail 39. While a manual indexing of the carriage 42 is illustrated, it will be appreciated that a piston-cylinder assembly, feed screw, or like mechanism may equally well be employed to index the carriage for automatic operation.

Mounted on the underside of the plate 43 by suitable fasteners 66 are piston-cylinder assemblies 67, 68 and 69 which are interconnected at the rod ends thereof by plate 70 secured to the respective cylinders by fasteners 71. The cylinders 67 through 69 including the lower plate 70 thereof thus constitute a fixed part of the carriage 42.

The plate 70 is provided with three apertures 73, 74 and 75 accommodating the rods 76, 77 and 78 of the piston-cylinder assemblies 67 through 69, respectively, for movement therethrough. The rods 76 and 78 are secured to the top or bight portions 80 and 81 of U-shaped brackets 82 and 83, respectively, the legs of which are flanged and secured by fasteners 84 (see FIG. 2) to pressure pad 85. Such fasteners may be of a nonconducting type material and a layer of electrical insulation may be provided between each bracket as indicated at 86 and 87 and the pressure pad 85. The piston rods 76 and 78 are thus physically interconnected for movement in unison and the piston-cylinder assemblies 67 and 69 may be termed pressure pad cylinders, it being apparent that extension of such cylinder assemblies will lower or move downwardly the pressure pad 85 and retraction will elevate such pressure pad.

As seen in FIG. 4, the pressure pad 85 may be provided with a central aperture 88 accommodating for vertical movement therein upper electrode 89 held by adapter 90 to holder 91. Such holder may be provided with tapped apertures 92 and 93 to which may be connected fluid conduits for circulation of a cooling medium therethrough. A clamp 94 and nut 95 secure the holder to adapter 96 which is in turn secured to the rod 77 of the piston-cylinder assembly 68. The piston-cylinder assembly 68 may be somewhat larger than the piston-cylinder assemblies 67 and 69 which vertically move the pressure pad. For example, piston-cylinder assemblies 67 and 69 may have a one and a half inch bore with a three inch stroke and a one inch rod, whereas the piston-cylinder assembly 68 may have a two inch bore with a three inch stroke and a one inch rod. Accordingly, the electrode piston-cylinder assembly 68 is capable of exerting a somewhat greater pressure than the piston-cylinder assemblies 67 or 69. Suitable hydraulic fluid connections may be supplied to both ends of the cylinders 67 through 69, and through proper valving, they may readily be extended and retracted.

The pressure pad 85 includes a bracket 100 thereon between the legs of the bracket 82 and a pneumatic piston-cylinder assembly 101 is mounted on such bracket. The rod 102 of such piston-cylinder assembly is provided with a yoke 103 connected by pin 104 to upwardly extending arm 105 of crank 106 which is fitted within slot 107 in the pressure pad 85. Such slot extends from the end of the pressure pad completely through to the vertical central aperture 88 accommodating the electrode tip 89 for vertical movement therein. The bottom of the slot is closed by a retaining plate 108 shown in greater detail in FIGS. 7 and 8. The end of the crank 106 is provided with a vertically elongated slot 109 through which extends pin 110 connecting such crank to indenting tool 111. One form of such tool is illustrated in detail in FIGS. 5 and 6. The piston-cylinder assembly 101 may be a relatively short stroke pneumatic piston-cylinder assembly having, for example, a one inch bore with a one inch stroke. In this manner, retraction of such piston-cylinder assembly will retract the rod 102 and thus the crank 106 to move the indenting tool 111 to the right as seen in FIG. 4 causing the same to move into the aperture 88 beneath the electrode tip 89 when the piston-cylinder assembly 68 is retracted and the piston-cylinder assemblies 67 and 69 are extended.

Referring now to FIGS. 5 and 6, the indenting tool 111 comprises a body 113, of, for example, cold rolled steel having projecting ears 114 on the end thereof with aligned apertures 115 and 116 therein adapted to receive the pin 110 to connect the tool to the end of the crank 106. A channel 117 is provided in the body 113 receiving an insert 118 which may be brazed in place and of, for example, a copper tungsten alloy. Both the ears or projections 114 and the insert 118 have co-planar inclined surfaces indicated at 119 and 120, respectively, which cooperate with inclined surfaces on the retainer plate 108 in a manner hereinafter described. The insert 118 is provided with a working tip or projection 121 of a selected profile to place in the work a groove of such selected profile. In the illustrated indenting tool, the profile is of a triangular sectional shape which will produce a triangular sectional groove in the work.

Referring now to FIGS. 7 and 8, the retainer plate 108 may be secured to the bottom of the pressure pad by suitable fasteners such as screws secured through countersunk holes 123 which may be eight in number and arranged as indicated in FIG. 8. The end of the retainer plate adjacent the aperture 88 is provided with a cutout portion or slot 124 with inclined cam fillets 125 and 126 being provided in the corners of such slot. The degree of inclination of such fillets may be the same as the degree of inclination of the co-planar surfaces 119 and 120 on the indenting tool. The cam surfaces provided thereby thus straddle the projecting ridge or working surface 121 of the tool 111 and it can now be seen that when the piston-cylinder assembly 101 is extended, the indenting tool 111 will be moved to the left as seen in FIGS. 4, 7 and 8 and the inclined surfaces 119 and 120 will cooperate with the inclined surfaces 125 and 126 to elevate the indenting tool so that the working surface 121 thereof will be above the bottom of the pressure pad 88. Since the retainer plate 108 is flushed with the bottom of the pressure pad as seen in FIG. 2, the indenting tool 111 will not only be retracted from the aperture 88 by extension of the piston-cylinder assembly 101, but will also be simultaneously elevated from the bottom plane of the pressure pad. Such bidirectional movement of the indenting tool is permitted by the pin and slot connection 110, 109 between the indenting tool and the crank 106.

Referring now to FIGS. 1 and 3, the post 31 is provided with an inclined frame portion 130 supporting the wire guide and feed unit 34. In FIG. 1, it will be appreciated that the frame 130 and the unit 34 is shown broken away and distorted for clarity of illustration. Starting at the distal or outer end of the frame 130, there is provided a wire spool unit 131, a wire straightener unit 132, and a further wire straightener unit 133. The unit 132 comprises a cluster of five rolls 134 journalled on plate 135 which extends normal to the mounting plate 136 of the frame 130. The straightening unit 133 comprises a cluster of five rolls 137 journalled on plate 138 which is mounted on bracket 139 so that the plate 138 is parallel to the mounting plate 136 or normal to the plate 135 of the unit 132. The wire passed through the straightener units 132 and 133 will be aligned and as indicated suitable grease fittings may be provided for each of the rolls in the clusters of the straightening units. Beneath the straightener unit 133, there is provided a feed unit 141 which includes a slide assembly 142 mounted for sliding movement on guide rods 143 and 144 secured to and extending between blocks 145 and 146 secured by fasteners 147 to the plate 136 of the stand 130. As seen in FIG. 1, a piston-cylinder assembly 150 is secured to the underside of the slide 142 by fasteners 151 and the rod 152 thereof is fixed to the uppermost block 146. Accordingly, an extension of the piston-cylinder assembly 150 will move the slide 142 along the slide rods 143 and 144 in a downward direction as viewed in FIG. 1 and, conversely, retraction of the piston-cylinder assembly will move the slide upwardly. The extent of movement of the slide may be controlled by a wire feed adjustment screw 154 having a lock nut 155 thereon, such screw projecting through the block 145 and thus being adjustably positioned at 156 to engage the blind end of the piston-cylinder assembly 150.

An upper wire guide tube 158 is mounted on the slide 142 and feeds the wire passing therethrough between the jaw elements 159 and 160 of a jamb cleat, each of which are mounted on posts 161 projecting from the slide 142 and biased by springs 162 to a closed position. A lower wire guide tube 164 projects from sleeve 165 mounted in lower wire guide tube feed block 166 mounted on the block 145 and such lower guide tube is mounted for axial movement in such sleeve limited by pin 167 and biased into its uppermost position by spring 168. It can now be seen that with a wire projecting through the aligned guide tubes 158 and 164, extension of the piston-cylinder assembly 150 will move the slide 142 along the guide rods 143 and 144 with the jaw elements 159 and 160 gripping the wire and pulling the same from the guide tube 158. The jaw elements will engage the lower guide tube 164 and move the same against the pressure of spring 168 forcing the wire through guide block 166. The gripping pressure of the jaw elements 159 and 160 will tend to maintain the wire thus gripped when the slide moves in a downward direction but will reelase the wire when the slide moves in the opposite or upper direction. From the feed block 166, the wire moves into a wire guide flexible cable assembly 170 which may be secured both to the block 166 and to the pressure pad 85 by adapters indicated at 171 in FIG. 4.

Referring now again to such FIG. 4, it will be seen that the pressure pad 85 is provided with a passage 173 having a liner 174 therein for accommodation of the wire W therethrough. Such passage terminates in a wire guide and cutter tip 175 adjacent the aperture 88 so that when a wire segment is fed into the aperture 88, the electrode tip 89 will cooperate with the cutter tip 175 to sever the wire W as the electrode tip descends.

Referring now to FIGS. 1 and 3, it will be seen that the shear unit 23 includes an L-shape frame 178 of channel sectional configuration which forms with the bed plate 21 a C-shape frame having an open end 179 permitting the machine to be indexed transversely of the strip on the rails 2 and 3. Guide posts 180 and 181 extend through sleeves 182 and 183 secured to the top of the frame 178 and are connected by pins 184 and 185 to hubs 186 and 187, respectively. Such hubs are secured to vertically movable knife plate 188 which is centrally connected at 189 to rod 190 of piston-cylinder assembly 191 mounted on the top of frame 178. A knife bar 193 is mounted on the underside of such plate and knife 194 is secured to the face thereof by fasteners 196. A pressure plate 197 biased downwardly by springs 198 is mounted adjacent the knife 194 for proper clamping and stripping of the work. A lower knife 199 is held to knife bar 200 by fasteners 201 and it can now be seen that extension of the piston-cylinder assembly 191 will move the plate 188 downwardly with the clamping plate 197 first engaging the strip and then the knife 194 moving downwardly therepast cooperating with the knife 199 to sever the strip. The guide posts 180 and 181 will move through lower bushings 203 and 204 as the knife descends. The piston-cylinder assembly will ordinarily be hydraulically actuated and as can be seen from the size thereof substantial shearing pressures will be developed.

As seen in FIGS. 1 and 2, the entry and exit clamps 22 and 24 may be of conventional variety such as the manually operable clamps illustrated. Each may comprise lower or anvil clamping members 205 and upper vertically adjustable clamping members 206 mounted on studs 207 which are vertically adjustable with respect to clamping arms 208. A toggle or other suitable actuating mechanism 209 may be employed to clamp and unclamp strip material between the clamping elements 205 and 206.

*Operation*

An exit strip end 215 is located in exit clamp 24 and can be sheared or not depending upon the end condition. If the exit strip is not sheared, the end 216 thereof is positioned on the center of the lower electrode 29 between the lower backup members 27 and 28. The strip will also laterally be positioned properly by the edge guide 25. A leading strip 217 is placed in the machine and can be sheared or not also depending on its end condition. Sheared, the end of the strip 217 will be placed projecting through the shear unit 23 and the entry clamp 22 will be closed. The shear piston-cylinder assembly 191 will be actuated causing the plate or platen 188 to move downwardly with the guides 180 and 181 moving into and through the bushings 203 and 204. The clamping plate 197 contacts the strip 217 prior to the shear knife 193 and when the knife elevates, the strip will be free when the exit clamp 22 is released for movement to the welding unit 33. The sheared leading end 218 may now be positioned adjacent to the exit strip end 216 on the lower electrode 29 with either a tight butt or a gap spacing depending upon the thickness of the strip. The gap may vary depending upon the strip thickness and the size of the machine used to join such strip from .020 up to 2 inches. The strip is aligned against the entry side guide 26 and may now be clamped in position by the entry clamp 22. The edges 216 and 218 to be joined are now supported by the lower electrode 29 and the strips 215 and 217 are firmly supported by the lower strip support backups 27 and 28.

The operator may now position the strip weld head assembly 33 in the desired spot over the preclamped strip ends by shifting the carriage 42 along the rail 39 by means of index handle 64 or by an electromechanical device, piston-cylinder assembly or other power device. When in the proper position, the piston-cylinder assemblies 67 and 69 may now be caused to extend vertically lowering the pressure pad 85 clamping the ends of the strip on the backups 27 and 28 and the electrode 29 therebetween. When the pressure pad 85 is moved downwardly, the upper electrode 89 will be withdrawn from the aperture 88 in the pressure pad 85. The piston-cylinder assembly 101 is now retracted moving the indenting or forging tool 111 into the aperture 88. When the tool 111, which may itself comprise an electrode, is properly positioned beneath the electrode 89, the piston-cylinder assembly 68 is now extended causing the stitch electrode 89 to descend, electrically, contacting the forging tool 11 and current will now pass through the forging tool, the strip ends 216 and 218, and the lower electrode 29 causing a heating and displacement in the surface of the strip. The notch formed in the strip will, of course, conform to the geometry of the notch in the tool 111. The elongated slot 109 and the pin 110 permits the tool to float upwardly and downwardly and thus move with the stitch electrode 89.

The upper electrode may have a positive potential while the lower electrode has a negative potential which may be obtained from a transformer, not shown. Electrical cables will, of course, be connected to the upper and lower electrode and such transformer may be provided with a tap switch, a current timer as well as a current switch so that the operator may merely push a button to obtain desired electrical heating action.

The piston-cylinder assembly 68 will now be retracted elevating the stitch electrode 89 and the piston-cylinder assembly 101 will then be extended or moved to the left as seen in FIG. 4 causing the tool 111 to be cammed upwardly and pulled out of the aperture 88 simultaneously, such upward camming of the tool being obtained by the inclined surfaces upon the tool and retainer plate shown in detail in FIGS. 5 through 8. Aligned notches or grooves of the desired shape and configuration are now formed in the ends of the strips to be secured.

The wire feed piston-cylinder assembly 150 is now actuated indexing the jamb cleat mounted on slide 142 causing the wire W to be drawn from the spool unit 131 through straighteners 132 and 133, guide tube 158, and forced through guide tube 164 and the flexible cable assembly 170 and the liner 174 in the pressure pad 85 to project the tip or end of the wire into the aperture 88 through the cutter 175. The length of wire projecting into the aperture 88 will, of course, be governed by the extent of movement of the slide 142 which is in turn governed by the position of the adjusting screw 154. The springs 162 will hold the cam jaw elements 159 and 160 in a wire gripping condition as the slide 142 indexes. As the wire W moves into the aperture 88, it will be fed into the preformed groove in the adjacent strip ends. When the piston-cylinder assembly 150 is retracted, the jamb plate will release the wire and the slide 142 will return to its full line position indicated in FIG. 3. Spring 168 will force the guide tube 164 outwardly to the position shown.

With the end of the wire now positioned in the groove formed by the forging or indenting tool 111, the piston-cylinder assembly 68 is again actuated to extend the electrode 89 into the aperture 88 with the electrode cooperating with the cutter tip 175 severing the wire. The electrode 89 now descends under considerable pressure to contact the wire segment in the groove and the weld button may again be actuated to cause current to flow from the electrode, through the wire, the adjacent strip ends, the lower electrode and back to the transformer. The stitch wire then is welded within the groove bridging the strip ends due to the heating effect of the current passing between the electrodes. The piston-cylinder assembly 68 is then retracted and the piston-cylinder assemblies 67 and 69 may also be retracted releasing the pressure pad. The carriage assembly 42 may now be indexed along the strip joint and the above-described operation may be repeated with the frequency and spacing desired.

The flexible cable assembly 170 will, of course, permit the carriage to index without affecting the wire feed. In this manner, the notch and weld stitch operation can be repeated along the two strip ends to give sufficient strength to the joint and permit the strips to be processed without breaking.

It will be appreciated that the shear unit 23 need not necessarily be incorporated with the machine of the present invention. However, if incorporated, the precise spacing of the shear from the weld unit can be utilized with further processing equipment in the strip line to obtain automatic spacing of the exit strip end. For example, if the strip material is being fed to a punch press or other strip forming machine having an automatic index of, for example, 8 inches, the shear unit may be positioned a multiple of 8 inches from the stitch welder electrode 29. If the shear unit is positioned 24 inches from the stitch welder, the press, having an automatic index of 8 inches, may then simply be indexed three times after the exit end is sheared to position the sheared exit end in the proper position beneath the weld unit. Of course, a spacing of any multiple of the automatic index of the press or other machine may be employed.

The electrodes employed with the machine of the present invention may be of a tungsten or chrome-moly alloy or a chrome-copper alloy obtaining both the proper hardness and electrical conductivity. Since both the brazed insert of the indenting or forging tool 111 and the electrode tip 89 will be employed to work metal, the latter mashing or forging the stitch wire into the preformed groove while simultaneously welding such wire therein, electrodes of the proper hardness are then provided.

Referring now to FIGS. 15 through 17, FIG. 15 illustrates a joint that may be made utilizing three stitch wires 220, 221 and 222 which are welded into grooves and such wires may bridge the butting ends 216 and 218 of the strips 215 and 217, respectively. In this manner, a strong strip butt joint may be provided. In FIG. 16, the strip ends 223 and 224 may be cut on a bias but parallel to each other and spaced to form a gap therebetween. Stitch wires 225, 226 and 227 may then be welded into corresponding grooves to bridge such gap. It is noted that whereas the strip ends are cut on a bias, the stitch wires 225 through 227 are laterally aligned. This can be accomplished simply by slightly biasing the shear unit 23 and maintaining the index path of the stitch welder normal to the longitudinal axis of the strips.

In FIG. 17, strip ends 228 and 229 are cut on a bias and gapped and two stitch wires 230 and 231 bridge the gap but extend normal to the gap edges. This can be accomplished by simply canting the rail 39 so that a stitch extends parallel to the shear unit 23 and both extends at the same angle to the strip axis.

FIGS. 18 through 21 illustrate in top plan view the shape of the grooves which may be formed in the ends of the strip. In FIG. 18, the groove 233 is provided with a rounded end 234. In FIG. 19, the groove 235 is provided with a larger and rounded end 236. In FIG. 20, the groove 237 is provided with a squared end 238 and in FIG. 21, the groove 239 is provided with a squared end 240 having a greater transverse dimension than the width of the groove 241 adjacent the strip edge. It will be appreciated that in the FIGS. 19 and 21 embodiments of the groove shape, that a dove-tail locking action is obtained when the wire is flattened or mashed and welded into the groove. This then precludes the wire from inadvertently pulling from the groove.

In FIGS. 9 through 12 there are illustrated in section various shapes of grooves as well as geometric configurations of wires that may be employed with the present invention. In FIG. 9, a relatively shallow triangular groove 243 is formed in the strip 244 and a round wire 245 may be fed therein to be mashed and welded. It will be appreciated that the illustrations in FIGS. 9 through 12 show the wire prior to the flattening and welding operation. In FIG. 10, a substantially deeper triangular groove 246 is provided and a wire 247 of vertically elongated rectangular sectional configuration may be fed therein. In FIG. 11, a semi-circular groove 248 is provided and a semi-circular wire 249 may be fed therein. In FIG. 12, a semi-circular groove 250 of fairly substantial depth may be formed in the strip and a triangular wire 251 of substantial size may be fed therein. It will be appreciated that wires such as those shown in FIGS. 10 and 12 provide initial line or point contact with the groove and can be employed to concentrate the current flow between the electrode, wire, strip and lower electrode to facilitate the heating and thus the welding operation.

In FIG. 13, there is illustrated a relatively deep groove 252 having squared corners for reception of the stitch wire therein. Conversely, as illustrated in FIG. 14, a relatively shallow groove 253 may be provided to receive the wire. In such latter case, the wire may project slightly from the top surface of the strip when the strip ends are joined and the wire is welded and flattened. Such groove does permit a minimization of surface irregularities or projecting portions of the welded wire which may damage subsequent machinery. The FIG. 14 embodiment may be employed where the continuous strip thus formed passes through a press or like machine not having finishing or reduction rolls which will contact the continuous strip.

It will be appreciated that the cross-sectional shape of the wire may be substantially any geometric configuration and similarly the cross-section of the indented portion of the strip may likewise vary widely in its geometrical configuration. The strip ends may be butted, gapped, cut on a bias, or cut in any desired pattern to produce the stitch weld joint. Similarly, the indentations may be provided with dove-tail portions providing a mechanical interlock between the stitch wire and the strip when the stitch wire is welded and mashed in place.

It will be seen that the process and machine of the present invention is particularly suitable for joining galvanized metal, painted, plastic coated, or other laminates, as shown in FIG. 13, in that the forging or indenting tool will provide a groove which cuts through the outer layer 254 of the strip exposing the inner metal 255 for proper application by welding of the stitch wire. It will also be appreciated that plastic wires may be employed, such as polyethylene, and that such may be heat sealed to polyethylene coated laminates in strip form. For example, polyethylene coated kraft paper may be joined by the machine and process of this invention.

It can now be seen that there is provided a process and machine for joining quickly and efficiently strip material forming an inexpensive joint which is yet of the high desired strength. Such strength may readily be controlled by the number of stitches employed. In an automatic operation of the machine, the joint can be produced quickly and efficiently yet such will have the desired strength. It is noted that the upper electrode tip 89 performs three functions, the first being the application of force to the indenting or forging tool 111, the second being the severing of the proper length of wire projecting through the cutter tip 175, and the final function being the welding and simultaneous mashing of the stitch wire within the groove formed by the tool 111. In this manner, a joint is produced having a minimum of surface irregularities or increased thickness which might cause severe damage to subsequent equipment in the continuous processing line.

Other modes of applying the principle of the invention may be employed, change being made as regards the details described, provided the features stated in any of the following claims or the equivalent of such be employed.

We, therefore, particularly point out and distinctly claim as our invention:

1. In a strip welding method utilizing a vertically movable electrode, the steps of placing a forging tool beneath such electrode, moving such electrode downwardly to force such forging tool against such strip to forge a groove therein, moving such electrode upwardly, withdrawing such forging tool and replacing the same with a stitch wire co-extensive with such groove, and then moving such electrode downwardly again to weld and mash such wire within such groove.

2. A machine for joining strip ends comprising a bed frame adapted to support such strip ends, a head member carried by said frame, means mounting said head member for movement transversely of such strip, a vertically movable electrode mounted on said head member, power means for raising and lowering said electrode, a vertically movable pressure pad mounted on said head member, power means for raising and lowering said pressure pad to clamp and unclamp such strip ends to said bed frame, an aperture in said pressure pad accommodating said electrode for vertical movement therein, a strip indenting tool, means mounting said tool for horizontal movement in said pressure pad into and out of said aperture, power means for shifting said tool into and out of said aperture, a wire feed passage in said pressure pad leading to said aperture, and means to feed a wire therethrough into said aperture whereby vertical movement of said electrode is operative first to forge a groove in such strip ends and then weld a wire into such groove to bridge and join such strip ends.

3. A machine as set forth in claim 2 including a bottom electrode mounted in said bed frame vertically aligned with said vertically movable electrode.

4. A machine as set forth in claim 2 including means to raise and lower said strip indenting tool as it is shifted into and out of said aperture.

5. A machine as set forth in claim 2 including a cutter tip in said wire feed passage operative to cooperate with said vertically movable electrode to sever a length of wire to be welded into such groove.

6. A machine as set forth in claim 2 including means to feed a predetermined length of wire through said wire feed passage to project into said aperture.

7. A machine as set forth in claim 2 wherein said head member is mounted on a carriage, a pair of hydraulic piston-cylinder assemblies extending vertically from said carriage supporting said pressure pad for vertical movement, and a single hydraulic piston-cylinder assembly therebetween constituting the power means for raising and lowering said electrode.

8. A machine as set forth in claim 2 wherein said head member is mounted on a carriage, which is in turn mounted on a rail extending transversely of such strip, roller means on said carriage engaging the sides and top of said rail only supporting said carriage thereon.

9. A machine as set forth in claim 2 including means operative to feed a wire through said wire feed passage into said aperture which comprises a wire index slide, a jamb cleat mounted on said index slide operative to grip such wire in one direction of movement only, and means limiting the extent of index movement of said slide and thus the extent of wire fed into said aperture.

10. A stitching head for strip joining machines and the like comprising a pressure pad, means to raise and lower said pressure pad into and out of pressure engagement with a pair of strip ends disposed therebeneath, an aperture in said pressure pad, a vertically movable pressure tool mounted for movement in such aperture, means to place a forging tool beneath said pressure tool to indent such strip ends on vertical movement of said pressure tool toward such strip ends, and means to feed a stitch into such aperture beneath said pressure tool after said forging tool is removed whereby vertical movement of said pressure tool toward such strip ends will force said stitch into the indentation in such strip ends.

11. A welding head for strip joining machines and the like comprising a pressure pad, means to raise and lower said pressure pad to clamp strip ends therebeneath, an aperture in said pressure pad, a vertically movable electrode mounted for movement in such aperture, means to place an electrically conductive forging tool beneath said electrode to forge a groove in such strip ends on vertical movement of said electrode, and means to feed a wire into such groove beneath said electrode after said forging tool is removed whereby vertical movement of said electrode will force said wire into the groove in such strip ends and weld the same therein.

12. A strip joining machine comprising a bed frame, a lower electrode in said bed frame, a welding head for such machine comprising a pressure pad, means to raise and lower said pressure pad to clamp strip ends to be joined therebeneath on said bed frame, an aperture in said pressure pad, a vertically movable electrode aligned with said lower electrode mounted for movement in such aperture, means to place an electrically conductive forging tool beneath said electrode to form a groove in such strip ends on vertical movement of said electrode, and means to feed a wire into such groove beneath said electrode after said forging tool is removed whereby vertical movement of said electrode will force said wire into such groove and weld the same therein.

13. A strip joining machine as set forth in claim 12 including means horizontally to shift said forging tool into and out of such aperture, and means responsive to such shifting movement to raise and lower said forging tool whereby said tool will be vertically above the bottom of said pressure pad when retracted from such aperture.

14. A strip joining machine as set forth in claim 13 including a wire feed passage in said pressure pad leading to such aperture, a cutter tip in said passage adjacent such aperture operative to cooperate with said electrode to sever a length of wire when said electrode descends to weld such wire in such groove.

15. A strip joining machine as set forth in claim 14 including a unidirectional feed for such wire comprising a reciprocable slide, a jamb cleat mounted on said slide operative to grip such wire in one direction of movement thereof only.

16. A strip joining machine as set forth in claim 15 including a piston-cylinder assembly mounted on said slide operative to reciprocate said slide, and adjustable stop means operative to limit the extent of reciprocation of said slide to control the extent of wire fed into such aperture.

17. A strip joining machine as set forth in claim 16 wherein said welding head is mounted on a carriage for indexing movement transversely of such strip, rail means supporting said carriage for such indexing movement, and roller means engaging the top of said rail means supporting said carriage thereon.

18. A strip joining machine as set forth in claim 17 wherein said carriage includes two vertically extending hydraulic piston-cylinder assemblies supporting said pressure pad for vertical movement.

19. A strip joining machine as set forth in claim 18 wherein said carriage includes a vertically extending hydraulic piston-cylinder assembly supporting said electrode for vertical movement.

20. A strip joining machine as set forth in claim 19 including a horizontally disposed piston-cylinder assembly mounted on said pressure pad operative to shift said forging tool into and out of such aperture.

21. A strip joining machine as set forth in claim 20 wherein said forging tool is connected to said horizontally disposed piston-cylinder assembly by means of a vertical slot and pin connection, a retainer plate therebeneath flush with the bottom of said pressure pad, and cam means on said retainer plate operative to raise and lower said forging tool as said forging tool is horizontally shifted thereabove.

22. The method of joining two metal elements together comprising the steps of aligning the ends of such elements, clamping the element ends in predetermined relative positions, forming grooves in each of the element ends, longitudinally feeding a stitch wire into such grooves, vertically moving an electrode toward such element ends during which the electrode cooperates with a cutter to sever the stitch wire to be co-extensive with such grooves, and continuing the movement of such electrode toward such element ends to mash and weld such wire in such grooves thereby bridging such element ends.

23. The method of joining two metal elements together comprising the steps of aligning the ends of such elements, clamping the element ends in predetermined relative positions, placing a forging tool between such element ends and an electrode, moving such electrode toward such element ends to force such forging tool against such element ends thereby forging grooves in such element ends, placing a co-extensive stitch wire in such grooves, and moving such electrode into contact with such stitch wire to mash and weld such wire in the grooves thus formed.

References Cited
UNITED STATES PATENTS

| | | | |
|---|---|---|---|
| 1,038,604 | 9/1912 | Lachman | 219—106 |
| 1,531,824 | 3/1925 | Smith | 219—61 |
| 1,665,038 | 4/1928 | Meadowcroft | 219—86 |
| 1,745,173 | 1/1930 | Leonard | 29—191 |
| 2,258,327 | 10/1941 | Kramer | 29—191 |
| 2,946,119 | 7/1960 | Jones et al. | 29—470 |
| 2,982,017 | 5/1961 | Drummond | 29—470 |
| 3,169,309 | 2/1965 | Groman | 219—482 X |

RICHARD M. WOOD, *Primary Examiner.*

H. BIZOT, *Examiner.*

R. O. DEAN, B. A. STEIN, *Assistant Examiners.*